(12) United States Patent
Morimoto et al.

(10) Patent No.: US 10,183,611 B2
(45) Date of Patent: Jan. 22, 2019

(54) LIGHT-DEVICE MOUNTING STRUCTURE OF VEHICLE

(71) Applicant: HONDA MOTOR CO., LTD., Tokyo (JP)

(72) Inventors: Jun Morimoto, Wako (JP); Tatsuya Shiokawa, Wako (JP); Masayuki Uzaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 269 days.

(21) Appl. No.: 14/822,071

(22) Filed: Aug. 10, 2015

(65) Prior Publication Data

US 2016/0090022 A1 Mar. 31, 2016

(30) Foreign Application Priority Data

Sep. 26, 2014 (JP) .................................. 2014-196080

(51) Int. Cl.
*B60Q 1/04* (2006.01)
*B60Q 1/068* (2006.01)

(52) U.S. Cl.
CPC ......... *B60Q 1/0683* (2013.01); *B60Q 1/0441* (2013.01)

(58) Field of Classification Search
None
See application file for complete search history.

(56) References Cited

U.S. PATENT DOCUMENTS

| 2012/0257400 | A1* | 10/2012 | Shibata | ................. B60Q 1/076 362/460 |
| 2014/0198516 | A1* | 7/2014 | Tajima | ................. F16H 19/08 362/523 |
| 2014/0376251 | A1* | 12/2014 | Willeke | ............... B60Q 1/0683 362/523 |
| 2016/0101754 | A1* | 4/2016 | Kohlmann | ........... B60Q 1/0408 362/546 |

FOREIGN PATENT DOCUMENTS

| CN | 201347157 Y | 11/2009 |
| JP | 2003-011719 A | 1/2003 |
| JP | 2003-239939 A | 8/2003 |
| KR | 2010-0006423 U | 6/2010 |

* cited by examiner

*Primary Examiner* — Elmito Breval
(74) *Attorney, Agent, or Firm* — Squire Patton Boggs (US) LLP (57) ABSTRACT

A light-device mounting structure of a vehicle includes a headlight unit including a lamp housing accommodating a light source. Support shafts are provided in the lamp housing and are supported in a light cover. In the light-device mounting structure, the support shafts are covered with support-shaft protective members. The support-shaft protective members are engaged non-rotatably relative to the support shafts. The light cover has fitting holes, and the support shafts are fitted into the fitting holes through the support-shaft protective members.

18 Claims, 8 Drawing Sheets

LIGHT-DEVICE MOUNTING STRUCTURE OF VEHICLE

BACKGROUND

Field

The present invention relates to a light-device mounting structure of a vehicle.

Description of the Related Art

In the vehicle light-device mounting structures in the related art, a structure of a lamp housing rotatably supported through a support shaft by a stay provided on the vehicle body is disclosed. See, for example, JP-A No. 2003-11719 (Patent Literature 1).

In the vehicle light-device mounting structures in the related art, a structure of a lamp housing rotatably provided by supporting a support shaft extending from the lamp housing to a frame through a bearing is also disclosed. See, for example, JP-A No. 2003-239939 (Patent Literature 2).

In the aforementioned light-device mounting structure in the related art, optical-axis adjustment is enabled by rotatably supporting the lamp housing, but foreign substances may intrude into a rotating part. Since the intrusion of foreign substances easily causes wear on the rotating part, it is desired to achieve the prevention of wear of the rotating part with a simple structure.

SUMMARY

The present invention has been made in light of the circumstances, and an object of the present invention is to achieve the prevention of wear of a rotating part with a simple structure in a light-device mounting structure of a vehicle.

To attain this object, an embodiment of the present invention provides a light-device mounting structure of a vehicle. The structure can include a light device provide with a lamp housing accommodating a light source. A light cover can be placed outside of the lamp housing, the lamp housing being provided with a support shaft supported in the light cover. The light device can be mounted in an optical-axis adjustable manner. In certain embodiments, the support shaft is covered with a support-shaft protective member. The support-shaft protective member is engaged non-rotatably relative with respect to the support shaft. The light cover has a fitting hole, and the support shaft is fitted into the fitting hole through the support-shaft protective member.

According to embodiments of the present invention, the support shaft of the lamp housing is covered with the support-shaft protective member. The support-shaft protective member is engaged non-rotatably relative with respect to the support shaft. And, the light cover has a fitting hole, and the support shaft is fitted into the fitting hole via the support-shaft protective member. As a result, the support shaft does not slide on the support-shaft protective member, but rotates relative to the fitting hole via the support-shaft protective member. As a result, the prevention of wear of the support shaft can be achieved with a simple structure.

Further, in certain embodiments, the support-shaft protective member includes a support-shaft fitting hole and a flange. The support shaft is fitted into the support-shaft fitting hole, and the support-shaft fitting hole is smaller than the flange.

According to certain embodiments, because the support-shaft fitting hole of the support-shaft protective member is smaller than the flange, the support shaft can be easily protected only by being fitted into the support-shaft fitting hole, and the flange facilitates the positioning of the support-shaft protective member.

Further, in certain embodiments, the support-shaft protective member includes a cap visor projecting from the flange, and the cap visor covers the support shaft.

According to certain embodiments, the intrusion of foreign substances into a gap between the support-shaft protective member and the support shaft can be prevented by the cap visor.

Further, in certain embodiments, the support-shaft fitting hole is formed in an approximate D shape as viewed in an axial direction. The approximate D shape of the support-shaft fitting hole makes it possible to mount the support-shaft protective member with a simple structure non-rotatably relative to the support shaft and without mistaking an assembling direction, resulting in prevention of wear of the support shaft.

In certain embodiments, the present invention provides a light-device mounting structure of a vehicle wherein a light device is provided with a lamp housing accommodating a light source. A light cover can be placed outside of the lamp housing. The light cover supports a support shaft, and the light device is mounted in an optical-axis adjustable manner. The light cover can include a visor provided above the fitting hole to which the support shaft is fitted, to project from the light cover. A groove can be provided underneath the fitting hole to penetrate through inside and outside of the light cover.

The light cover can include the visor provided above the fitting hole to which the support shaft is fitted to project from the light cover, and the groove provided underneath the fitting hole to penetrate through inside and outside of the light cover. As a result, the intrusion of foreign substances into the support shaft can be prevented by the visor. Also, even if foreign substances intrude into a gap between the fitting hole and the support-shaft protective member, the foreign substances can be discharged out of the groove located below. This makes it possible to prevent wear of the support shaft with a simple structure.

Further, the groove can have a discharge passage for discharging foreign substances. The discharge passage descends from the outside to the inside of the light cover. The discharge passage can expedite the downward discharge of foreign substances.

Further, the groove is formed to have a smaller size on the outside than on the inside of the light cover. The groove enables the discharge of foreign substances in a gap between the support-shaft protective member and the fitting hole, while a reduction in the amount of foreign substances intruding into the groove from the outside can be achieved.

Further, walls can be formed on lateral sides of the discharge passage. The scattering of the foreign substances discharged from the discharge passage can be prevented by the walls, and also the headlight unit can be rigidly supported through the support-shaft protective members.

Further, in certain embodiments, the support shaft is covered with a support-shaft protective member. The support-shaft protective member is engaged non-rotatably relative with respect to the support shaft, and the support shaft is fitted into the fitting hole through the support-shaft protective member.

It is thus possible to mount the support-shaft protective member with a simple structure non-rotatably relative to the support shaft and without mistaking an assembling direction, resulting in prevention of wear of the support shaft.

Further, in certain embodiments, the support-shaft protective member includes a support-shaft fitting hole and a flange. The support shaft is fitted into the support-shaft fitting hole, and the support-shaft fitting hole is smaller than the flange. The support shaft can be easily protected only by being fitted into the support-shaft fitting hole, and the flange can facilitate the positioning of the support-shaft protective member.

Further, in certain embodiments, the support-shaft protective member includes a cap visor projecting from the flange. The cap visor covers the support shaft. The cap visor makes it possible to prevent foreign substances from intruding into a gap between the support-shaft protective member and the support shaft.

Further, the support-shaft fitting hole is formed in an approximate D shape as viewed in an axial direction. It is therefore possible to mount the support-shaft protective member with a simple structure non-rotatably relative to the support shaft and without mistaking an assembling direction, resulting in prevention of wear of the support shaft.

Further, in certain embodiments, the light cover constitutes a part of a vehicle front fender. The stiffness of the light cover can thus be enhanced.

According to embodiments of the invention, therefore, the support shaft does not slide on the support-shaft protective member, but rotates relative to the fitting hole via the support-shaft protective member. As a result, the prevention of wear of the support shaft can be achieved with a simple structure.

Because the support-shaft fitting hole of the support-shaft protective member is smaller than the flange in certain embodiments, the support shaft can be easily protected only by being fitted into the support-shaft fitting hole, and the flange facilitates the positioning of the support-shaft protective member.

As mentioned previously, the intrusion of foreign substances into a gap between the support-shaft protective member and the support shaft can be prevented by the cap visor.

In certain embodiments, the approximate D shape of the support-shaft fitting hole makes it possible to mount the support-shaft protective member with a simple structure non-rotatably relative to the support shaft and without mistaking an assembling direction, resulting in prevention of wear of the support shaft.

In certain embodiments, the light cover includes the visor provided above the fitting hole to which the support shaft is fitted to project from the light cover, and the groove provided underneath the fitting hole to penetrate through inside and outside of the light cover. As a result, the intrusion of foreign substances into the support shaft can be prevented by the visor. Also, even if foreign substances intrude into between the fitting hole and the support-shaft protective member, the foreign substances can be discharged out of the groove located below. This makes it possible to prevent wear of the support shaft with a simple structure.

According to certain embodiments, the discharge passage descending from the outside to the inside of the light cover can expedite the downward discharge of foreign substances.

According to certain embodiments, because a groove is formed to have a smaller size on the outside than on the inside of the light cover, the groove enables the discharge of foreign substances in a gap between the support-shaft protective member and the fitting hole, while a reduction in the amount of foreign substances intruding into the groove from the outside can be achieved.

In certain embodiments, because the walls are formed on lateral sides of the discharge passage, the scattering of the foreign substances discharged from the discharge passage can be prevented by the walls and also the headlight unit can be rigidly supported through the support-shaft protective members.

In certain embodiments, it is possible to mount the support-shaft protective member with a simple structure non-rotatably relative to the support shaft and without mistaking an assembling direction, resulting in prevention of wear of the support shaft.

In certain embodiments, the support shaft can be easily protected only by being fitted into the support-shaft fitting hole, and the flange can facilitate the positioning of the support-shaft protective member.

In certain embodiments, the cap visor makes it possible to prevent foreign substances from intruding into a gap between the support-shaft protective member and the support shaft.

In certain embodiments, it is possible to mount the support-shaft protective member with a simple structure non-rotatably relative to the support shaft and without mistaking an assembling direction, resulting in prevention of wear of the support shaft.

In certain embodiments, because the light cover constitutes a part of the vehicle front fender, the stiffness of the light cover can be enhanced.

BRIEF DESCRIPTION OF DRAWINGS

FIGS. 5(A) and 5(B) are views showing a support-shaft protective member 45, in which FIG. 5(A) is a front view and FIG. 5(B) is a V-V section view.

DETAILED DESCRIPTION

Hereinafter, an embodiment of the present invention will be described with reference to the accompanying drawings. It is to be noted that, throughout the description, references to directions, such as front, rear, left, right, upward, and downward, are made with reference to a vehicle body, unless otherwise stated. It is also to be noted that, in the drawings, reference sign FR denotes the front of the vehicle body, reference sign UP denotes the upper side of the vehicle body, and reference sign R denotes the right of the vehicle body.

Figure 1:
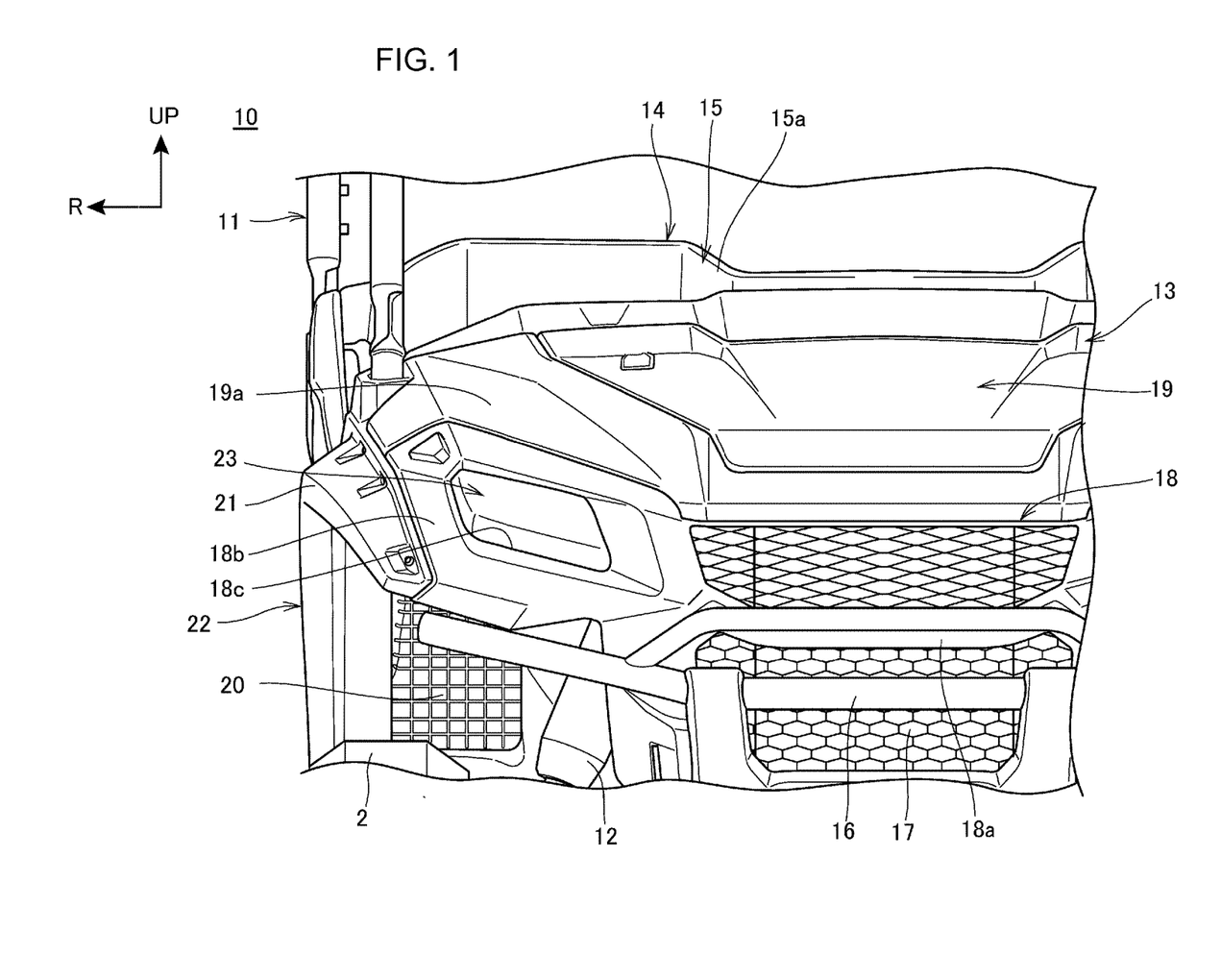
FIG. 1 is a view of a front right portion of an ATV according to an embodiment of the present invention when viewed from the front of the vehicle.

FIG. 1 is a view of a front right portion of an ATV (All Terrain Vehicle) 10 according to an embodiment of the present invention when viewed from the front of the vehicle. Incidentally, for components provided in left-right pairs, the right components alone are shown with signs in FIG. 1.

The ATV 10 is a four-wheeled vehicle including a body frame 11 as a framework, a pair of left and right front wheels 2 supported to a front portion of the body frame 11 through a pair of left and right front suspensions 12, 12 and a pair of left and right rear wheels (not shown) supported to a rear portion of the body frame 11 through rear suspensions (not shown).

The ATV 10 includes a body cover 13 covering the body frame 11. The ATV 10 has a cabin 14 for an occupant to ride placed in the rear of the front wheels 2, the cabin 14 being provided with a seat 15 on which the occupant is to sit. In FIG. 1, a backrest 15a of the seat 15 is shown. Doors (not shown) are provided on the left and right sides of the cabin 14.

A front bumper 16 extending in the vehicle-width direction is mounted on the center of a front end portion of the body frame 11. A radiator 17 for the engine and the front suspensions 12, 12 are placed in the rear of the front bumper 16 and forward of the cabin 14.

A front section of the body cover 13 includes a front cover 18 constituting the front face of the body cover 13, an upper cover 19 continued to the upper edge of the front cover 18 and extending upwardly toward the rear to the front of the cabin 14, back covers 20 covering the front wheels 2 from behind, and side edge covers 21 extending along outer edges in the vehicle-width direction of the front cover 18, the upper cover 19 and the back cover 20. The front cover 18, upper cover 19, back covers 20 and the side edge covers 21 are resin-made covers.

The front cover 18 includes a grille 18a covering the radiator 17 from the front, and a pair of left and right light front-covers 18b,18b extending upward toward the lateral sides from the upper left and right portions of the grille 18a. The upper cover 19 covers the radiator 17 and the front suspensions 12, 12 from above. The light front-covers 18b, the left and right side portions 19a of the upper cover 19, the back covers 20 and the side edge covers 21 constitute a front fender 22 (vehicle fender) covering the front wheels 2 from above and behind.

The ATV 10 includes a pair of left and right headlight devices 23, 23 for illuminating ahead of the vehicle. The headlight devices 23, 23 are placed respectively in the rear of the light front-covers 18b and below the side portions 19a of the upper cover 19. The light front-covers 18b includes light openings 18c to expose the front faces of the headlight devices 23, 23 toward the front.

Figure 2:
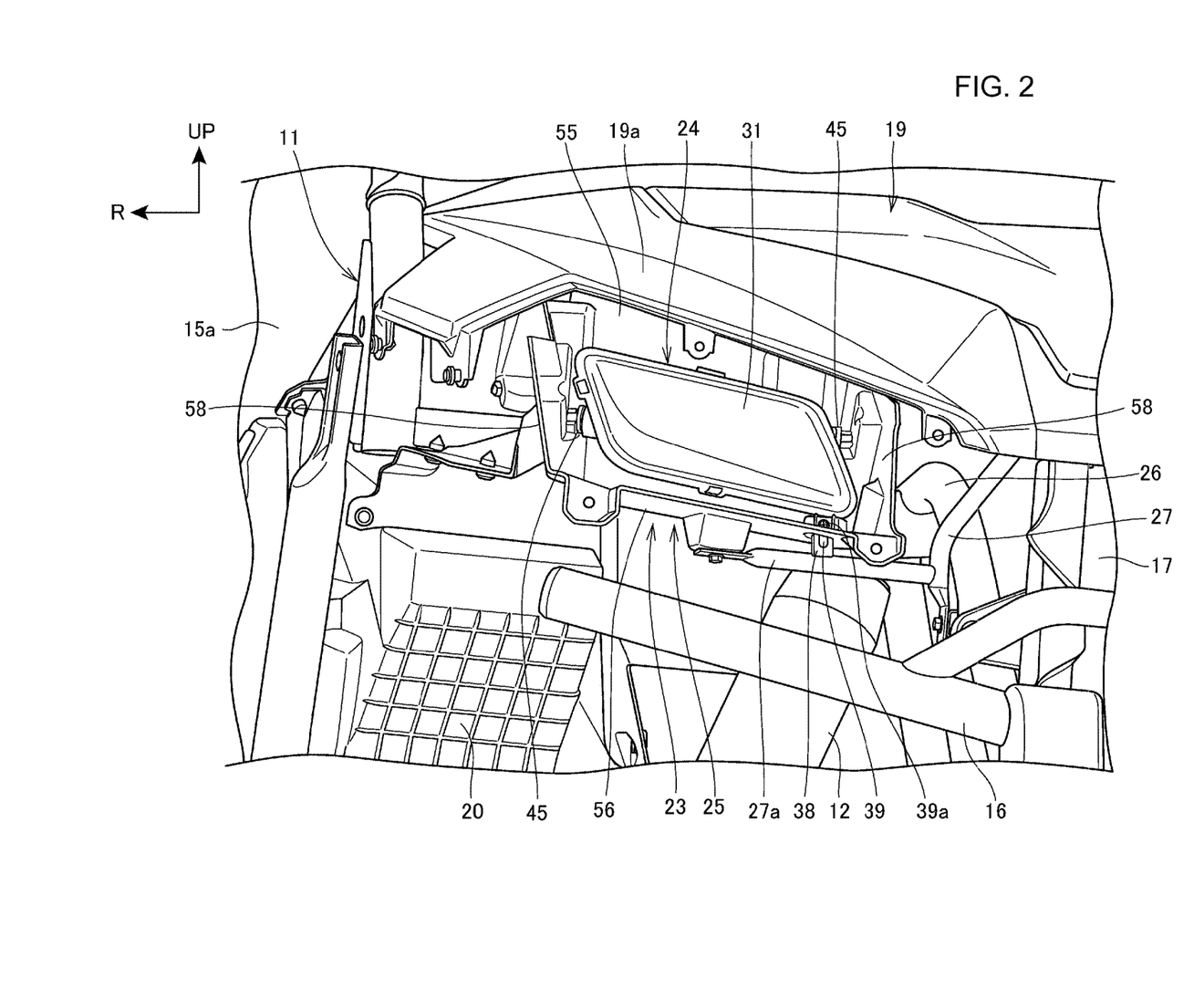
FIG. 2 is a view of the front right portion of the ATV with a front cover and the like removed when viewed from the front of the vehicle.

FIG. 2 is a view of the front right portion of the ATV 10 with the front cover 18 and the like removed when viewed from the front of the vehicle. Since the headlight devices 23, 23 are left-right symmetrically structured, the right-side headlight device 23 will be described here.

The headlight device 23 includes a headlight unit 24 (light device), and a light cover 25 supporting the headlight unit 24 on the inner side.

As illustrated in FIG. 2, the body frame 11 includes a suspension support frame 26 extending in the up-and-down direction on the inner side of the front wheel 2 in the vehicle-width direction to support the top end of the front suspension 12 at the top end thereof. A stay 27 extending upward is connected to an outer side face of an upper portion of the suspension support frame 26. The stay 27 includes a headlight stay 27a extending nearly horizontally outward in the vehicle-width direction below the top end of the suspension support frame 26. A lower portion of the light cover 25 is supported by the headlight stay 27a.

Figure 3:
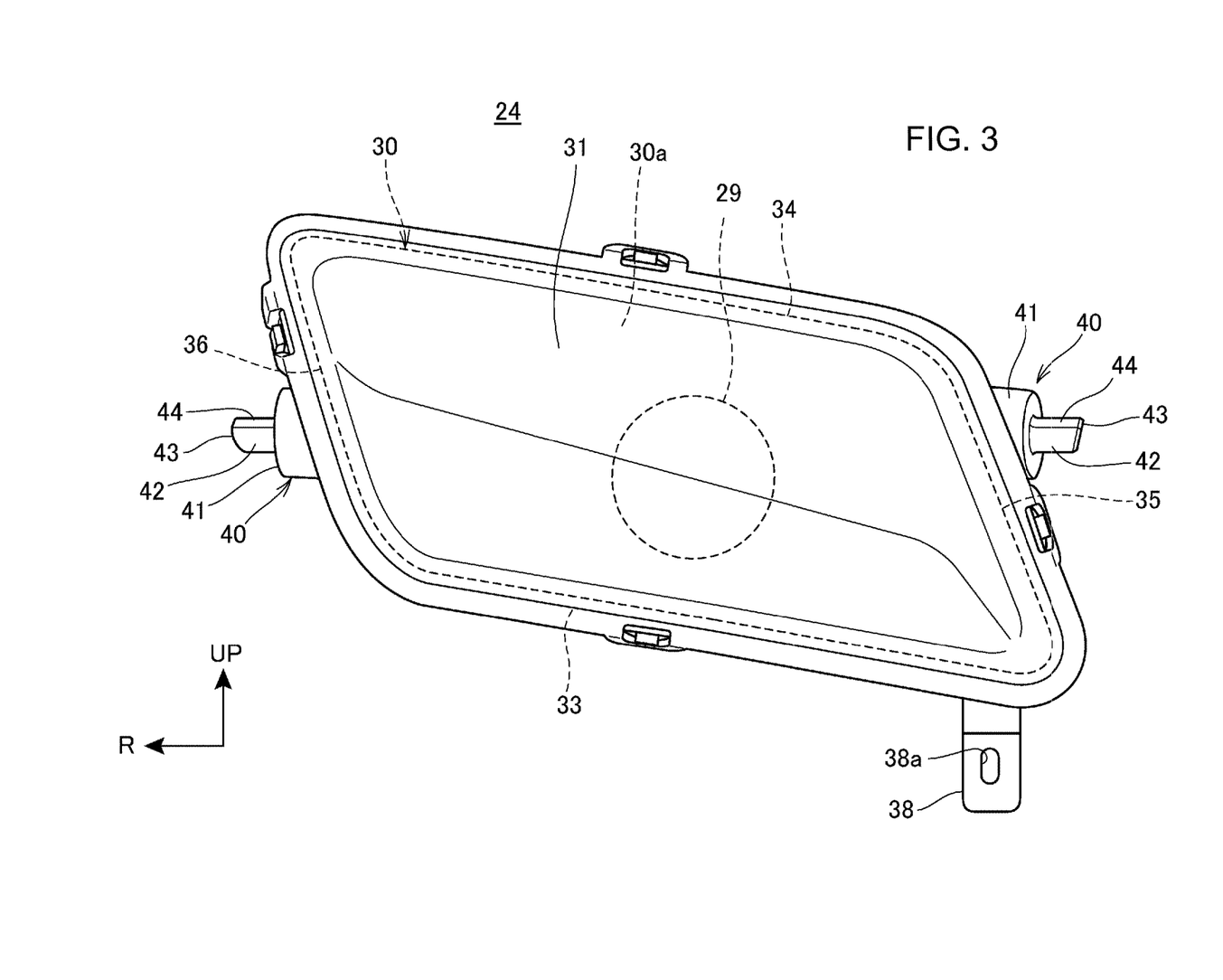
FIG. 3 is a front view of a headlight unit.
Figure 4:
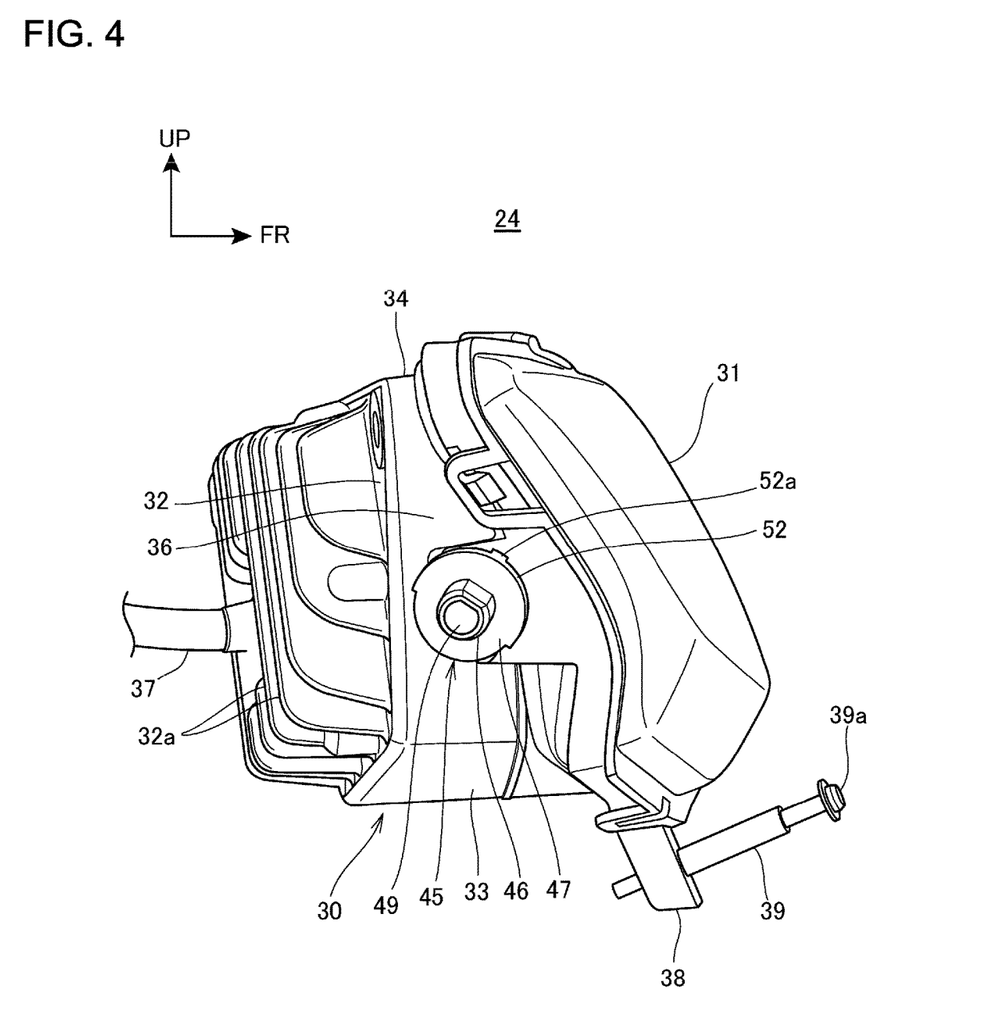
FIG. 4 is a side view of the headlight unit when viewed from right side.

FIG. 3 is a front view of the headlight unit 24. FIG. 4 is a side view of the headlight unit 24 when viewed from right side. The headlight unit 24 with a support-shaft protective member 45 to be described later being mounted thereon is shown in FIG. 4.

The headlight unit 24 includes a lamp housing 30 accommodating a light source 29, and a lens 31 blocking an opening 30a provided on the front face of the lamp housing 30. The headlight unit 24 is formed to be longer in the vehicle-width direction than in the up-and-down direction as viewed from front.

The lamp housing 30 includes an approximately rectangular rear wall 32 facing the opening 30a, a bottom wall 33 extending forward from the bottom edge of the rear wall 32, a top wall 34 extending forward from the top edge of the rear wall 32, an inward wall 35 extending forward from the inward edge of the rear wall 32, and an outward wall 36 extending forward from the outward edge of the rear wall 32. The front edges of the bottom wall 33, top wall 34, inward wall 35 and the outward wall 36 are combined together to define the opening 30a, and the lens 31 is mounted such that the peripheral edge abuts on the peripheral edge of the opening 30a.

A plurality of radiating fins 32a extending rearward are formed on the rear face of the rear wall 32. In a central portion of the rear wall 32, a cable 37 is connected for power supply to the light source 29.

A connector 38 extending downward is provided in the front of the bottom wall 33 in the vicinity of the inward wall 35. The connector 38 is perforated to create a hole 38a to which an adjustment rod 39 (FIG. 4) is connected for adjustment of the optical axis in the headlight unit 24. The adjustment rod 39 extends forward with the rear end being connected to the hole 38a, and includes a screw portion 39a provided at the front end to extend in the axial direction of the adjustment rod 39.

The lamp housing 30 includes a pair of left and right support shafts 40, 40 each extending laterally. The support shafts 40, 40 are provided respectively on the outward wall 36 and the inward wall 35. The entire lamp housing 30 including the support shafts 40, 40 is integrally formed by resin molding.

The support shafts 40, 40 are fitted into the light cover 25 so that the headlight unit 24 is pivotally supported by the light cover 25. The support shafts 40, 40 are provided respectively on the outward wall 36 and the inward wall 35. Because the support shafts 40, 40 and the regions into which the support shafts 40, 40 are fitted are approximately left-right symmetrical on either lateral side, the structure on the outward wall 36 side is here described in detail and a description on the inward wall 35 side is omitted as appropriate.

As illustrated in FIG. 3, the support shaft 40 includes a base 41 erected laterally from the outward wall 36, and a cylinder-shaped shaft body 42 erected laterally from the center of the base 41. The base 41 is formed in an approximately circular shape with a larger diameter than that of the shaft body 42 and is placed approximately coaxially with the shaft body 42, as viewed in the axial direction.

The shaft body 42 includes an obliquely inclined leading-end face 43. The leading-end face 43 is inclined such that the top end farthest projects as viewed from the front of the headlight unit 24.

The shaft body 42 includes a shaft-side flat-face 44 formed by cutting out flat an upper face of the outer peripheral portion. The shaft-side flat-face 44 is formed along the overall length of the shaft body 42. In short, the shaft body 42 is formed in an approximate D shape as viewed in the axial direction.

As illustrated in FIG. 4, the cap-shaped support-shaft protective member 45 is attached to the support shaft 40. The support shaft 40 is fitted through the support-shaft protective member 45 into the light cover 25.

Figure 5A:
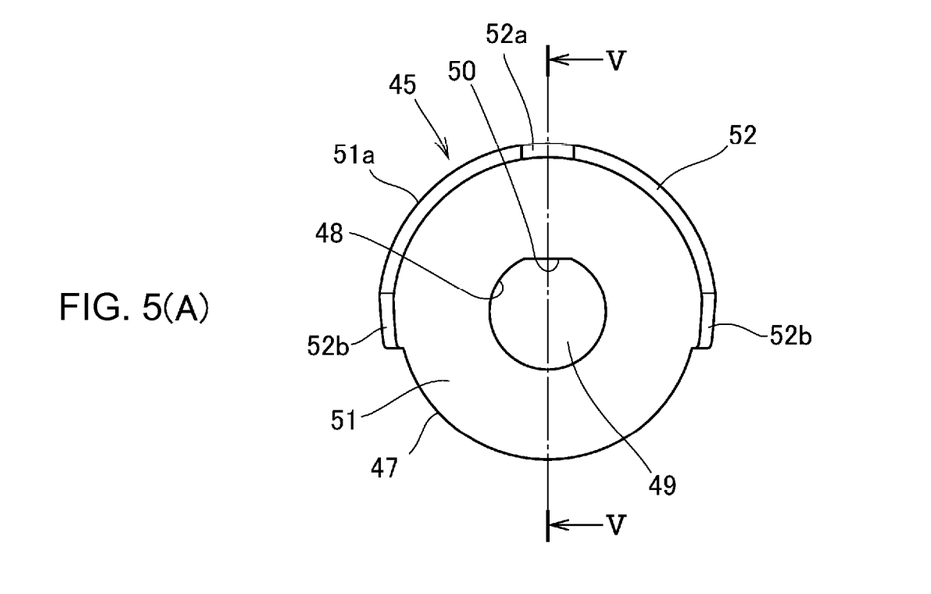
Figure 5B:
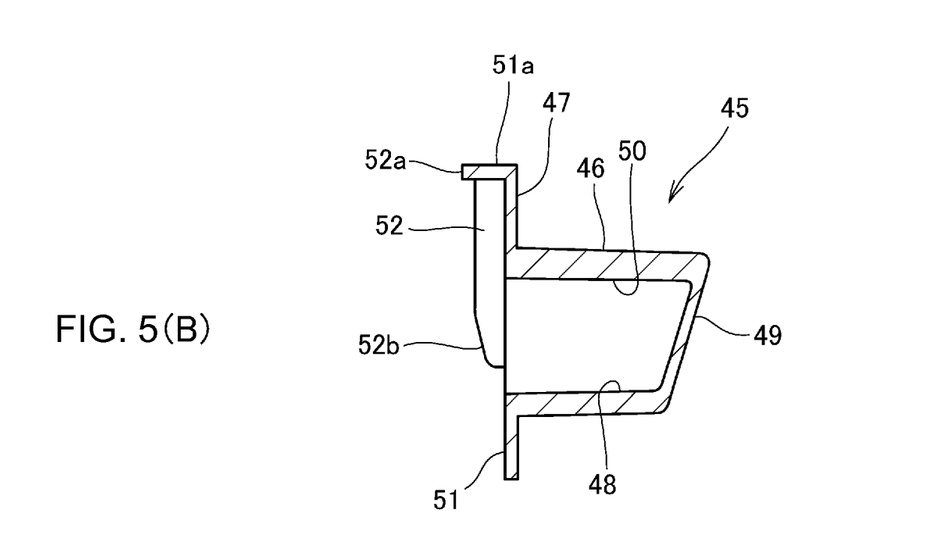

FIGS. 5(A)-5(B) are views showing the support-shaft protective member 45, in which FIG. 5(A) is a front view and FIG. 5(B) is a V-V section view.

As illustrated in FIG. 4 and FIGS. 5(A)-5(B), the support-shaft protective member 45 includes a tubular portion 46 and a disc-shaped flange 47 extending radially outward from the outer periphery of the tubular portion 46.

The tubular portion 46 includes a support-shaft fitting hole 48 into which the shaft body 42 is fitted. The tubular portion 46 includes a bottom wall 49 closing the leading end, so that the support-shaft fitting hole 48 is blocked by the bottom wall 49. The bottom wall 49 is formed to have an inclined face in accordance with the shape of the leading end face 43 of the shaft body 42. The support-shaft fitting hole 48 includes a hole-side flat-face 50 extending throughout in the axial direction, and is formed in an approximate D shape as viewed in the axial direction. By fitting the shaft body 42 into the support-shaft fitting hole 48, the shaft-side flat-face 44 abuts on the hole-side flat-face 50 so that the shaft body 42 and the support-shaft fitting hole 48 are mutually locked to prevent rotational motion. In short, the support-shaft protective member 45 is engaged non-rotatably relative with respect to the shaft body 42.

The flange 47 is formed at the base end of the tubular portion 46. The flange 47 includes a disc-shaped disc 51 that includes a large-diameter portion 51a having an outer periphery partially projecting outward in the radial direction. The disc 51 is placed approximately coaxially with the tubular portion 46. The large-diameter portion 51a is formed continuously along a slightly larger area than half the entire outer periphery of the disc 51. The flange 47 includes a rib-shaped outer visor 52 (cap visor) erected along the peripheral edge of the large-diameter portion 51a and in the axial direction opposite to the tubular portion 46.

The outer visor 52 includes a protrusion 52a protruding in the axial direction from a middle portion in the peripheral direction of the outer visor 52. The protrusion 52a and the hole-side flat-face 50 are approximately aligned in the peripheral direction of the support-shaft protective member 45. Specifically, when the support-shaft protective member 45 is mounted to the shaft body 42, the support-shaft protective member 45 is positioned in the peripheral direction by the shaft-side flat-face 44 on the upper face of the shaft body 42, while the outer visor 52 covers the support shaft 40 from above. The inner diameter of the outer visor 52 is slightly larger than the outer diameter of the base 41 of the support shaft 40.

The outer visor 52 is provided at both ends with inclined portions 52b, 52b each with the protruding height gradually decreased toward the ends in the peripheral direction.

Figure 6:
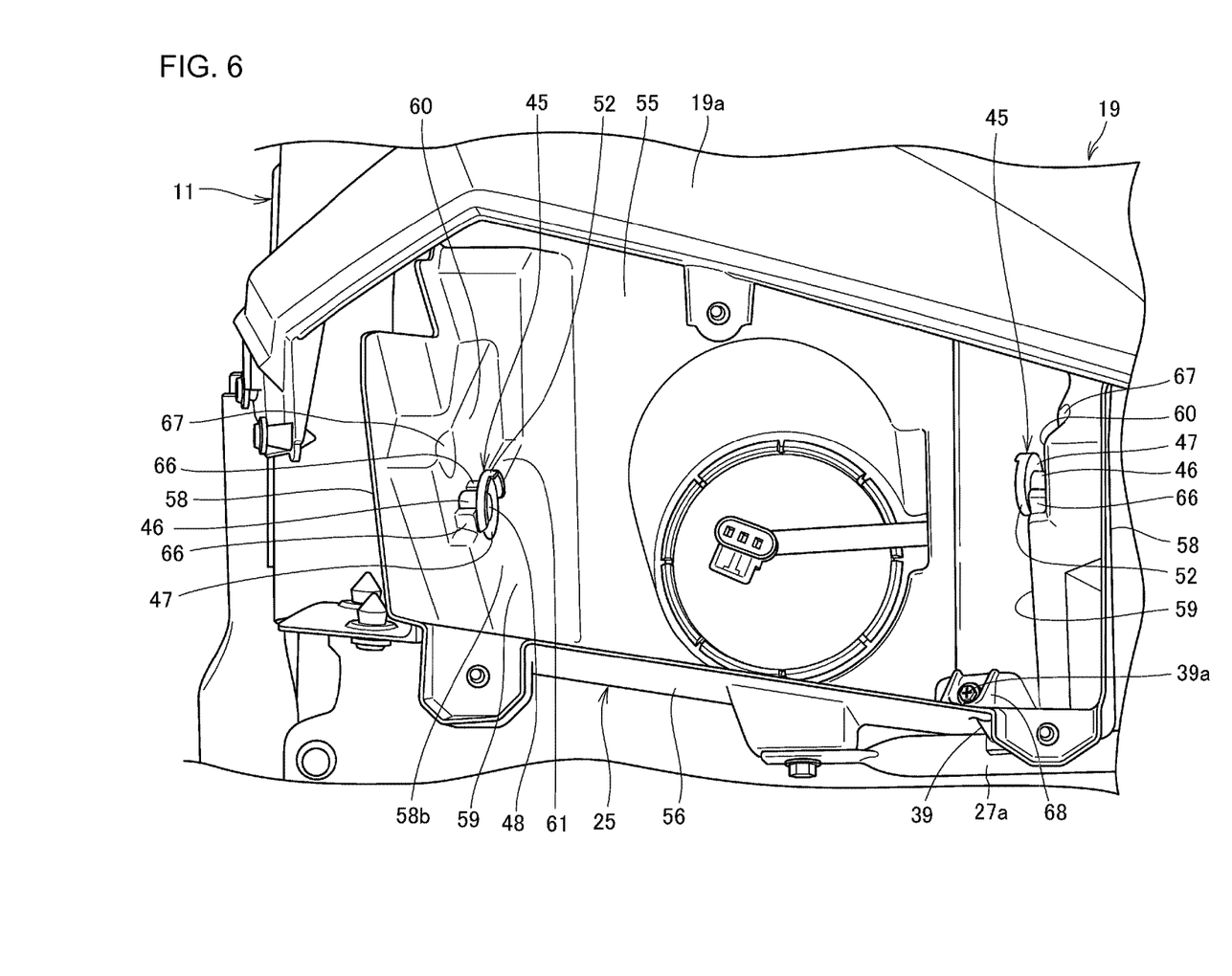
FIG. 6 is a view of a light cover after removal of the headlight unit as viewed from front.
Figure 7:
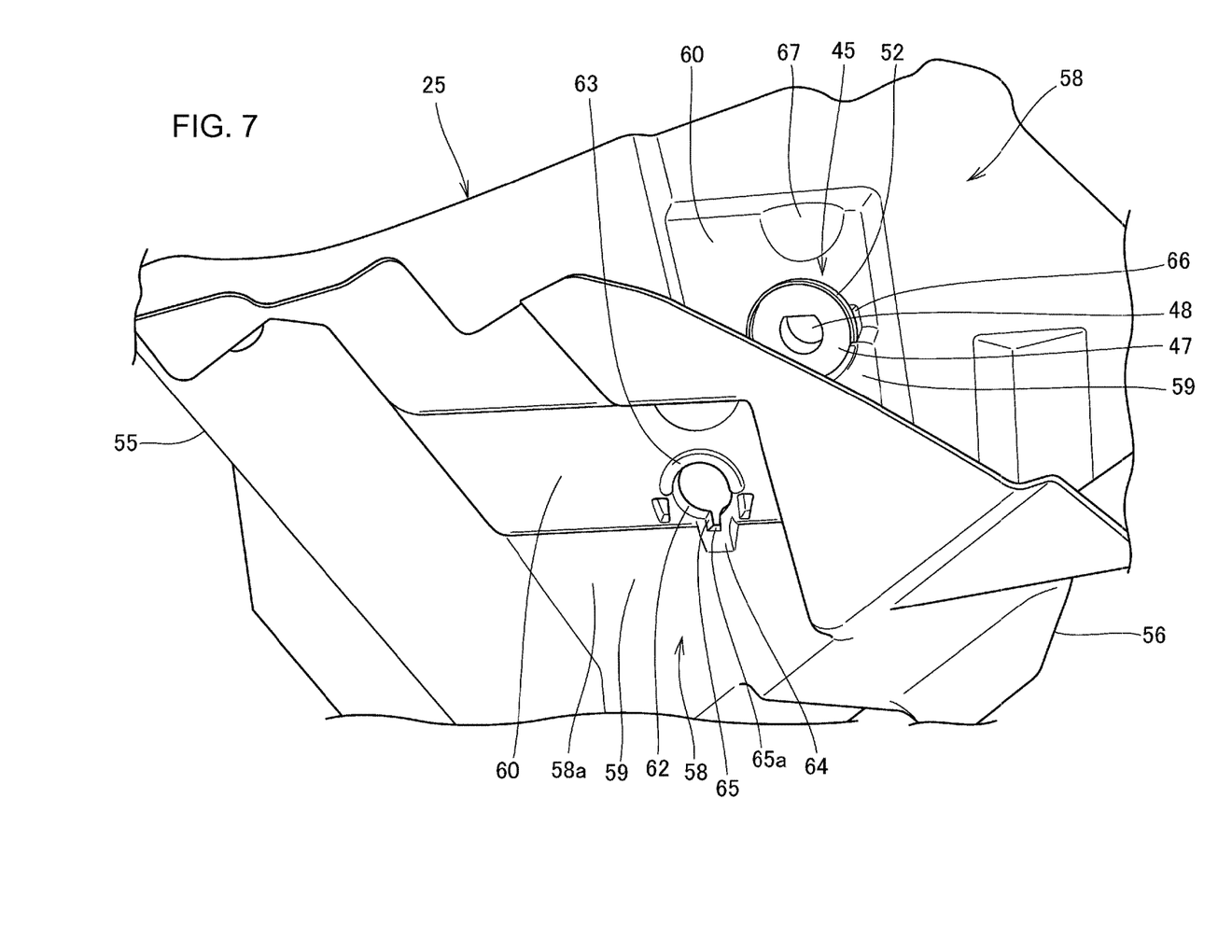
FIG. 7 is a view of the light cover as viewed from outer side.
Figure 8:
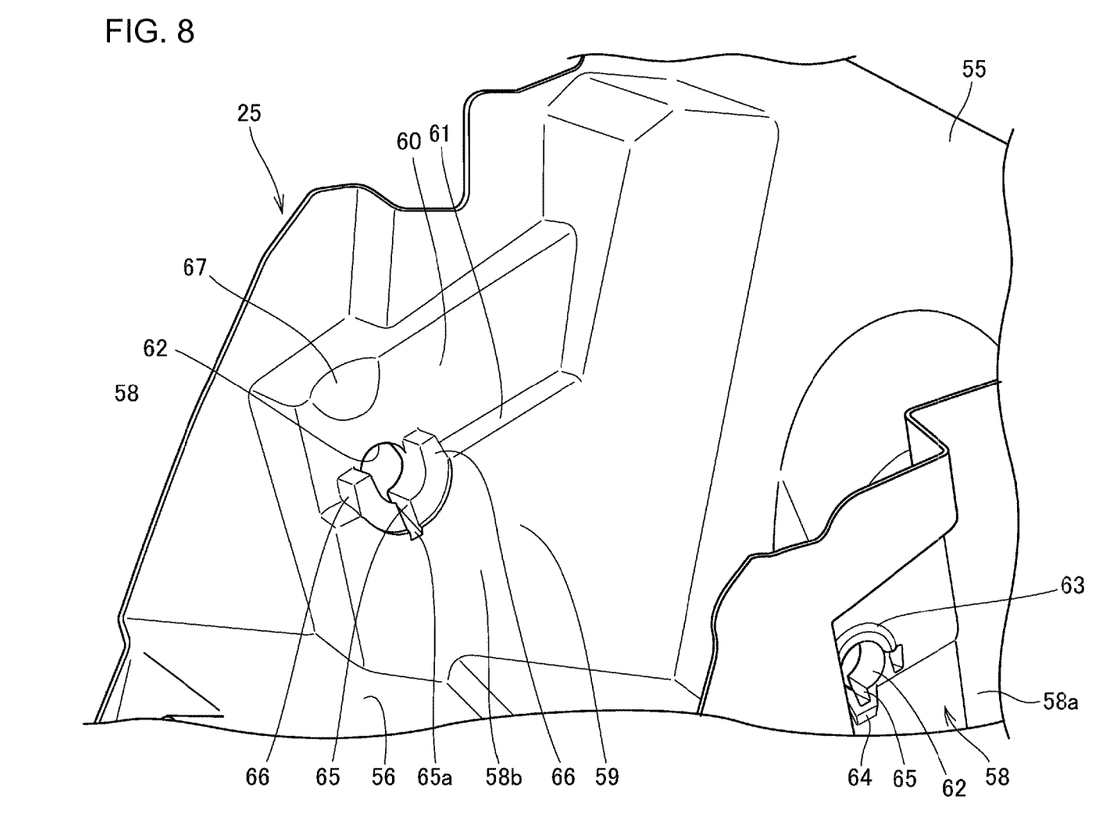
FIG. 8 is a view illustrating the interior structure of the light cover.

FIG. 6 is a view of the light cover 25 after removal of the headlight unit 24 as viewed from front. FIG. 7 is a view of the light cover 25 as viewed from outer side. FIG. 8 is a view illustrating the interior structure of the light cover 25. FIG. 6 here shows the light cover 25 with the support-shaft protective member 45 being attached thereto. FIG. 7 shows only one of the pair of the support-shaft protective members 45, provided on the inward side in the vehicle-width direction.

Referring to FIG. 6 to FIG. 8, the light cover 25 is formed in a case shape with openings on the upward and forward sides, and accommodates the headlight unit 24 inside.

The light cover 25 includes a cover rear-wall 55 placed descending forward, a cover front-wall 56 placed ascending forward to extend forward from the lower edge of the cover rear-wall 55, and a pair of cover side-walls 58, 58 respectively joining the left and right side edges of the cover rear-wall 55 and the cover front-wall 56 to each other in the front-and-rear direction. The upper edge of the cover rear-wall 55 is located at a higher level than the front edge of the cover front-wall 56, so that the light cover 25 has openings on the upward and forward sides. As illustrated in FIG. 1 and FIG. 2, the openings are covered from above with the upper cover 19 and also covered from front with the light front-cover 18b.

The entire light cover 25 is integrally formed by resin molding.

The cover side-wall 58 of the light cover 25 includes a lower bulgy portion 59 and an upper bulgy portion 60 which are formed by causing the wall to bulge toward the interior of the light cover 25. The lower bulgy portion 59 has a greater amount of inward bulge than the upper bulgy portion 60, and is located underneath the upper bulgy portion 60 to be continuous with the lower edge of the upper bulgy portion 60. The upper face of the lower bulgy portion 59 serves as a step 61 for connection of the lower bulgy portion 59 to the upper bulgy portion 60.

In the cover side-wall 58, a fitting hole 62 is formed for the tubular portion 46 of the support-shaft protective member 45 to be fitted. The fitting hole 62 is a circular through hole placed astride the upper bulgy portion 60 and the lower bulgy portion 59. Specifically, the fitting hole 62 has an upper portion and a middle portion formed in the lower portion of the upper bulgy portion 60, and a lower portion formed in the upper portion of the lower bulgy portion 59 including the step 61.

On the outer face 58a of the cover side-wall 58, a visor 63 is provided to project from the cover side-wall 58 to above the fitting hole 62. The visor 63 is a rib-shaped protrusion erected outward and along the peripheral edge of the upper half of the fitting hole 62, which is formed in an approximately semicircular arc shape in side view. The inner peripheral portion of the visor 63 constitutes a part of the inner periphery of the fitting hole 62.

From the outer face 58a of the cover side-wall 58, a rib 64 protrudes outward and is continuous with the lower end of the visor 63. The rib 64 extends in a range of the lower bulgy portion 59 and the step 61 underneath the fitting hole 62, and the width of the rib 64 is smaller than the inner diameter of the fitting hole 62.

The cover side-wall 58 includes a groove 65 formed underneath the fitting hole 62 to penetrate through inside and outside of the light cover 25. The groove 65 is formed by cutting out downward the lower portion of the inner periphery of the fitting hole 62 to communicate with the fitting hole 62. The groove 65 penetrates through the upper portion of the rib 64.

The groove 65 is shaped into an approximate rectangle as viewed from outside. A bottom 65a of the groove 65 is inclined gradually downward toward an inner face 58b from the outer face 58a of the cover side-wall 58 in the vehicle-width direction. Because of this, the vertical size of the groove 65 is set such that the size on the outer face 58a is smaller than that on the inner face 58b. The width of the groove 65 is approximately constant throughout the length of the groove 65.

On the inner face 58b of the cover side-wall 58, a pair of walls 66, 66 extend from the peripheral edge of a middle portion of the fitting hole 62 in the vertical direction toward the interior of the light cover 25. The pair of the walls 66, 66 are approximately symmetrically placed about the groove 65 in the front-and-rear direction, and are continuous with the step 61 and extend upward. The walls 66, 66 are situated on the left and right sides of the exit of the groove 65 from a perspective of substances intruding into the inside of the cover side-wall 58 through the groove 65.

The lower half of the fitting hole 62 is formed by recessing a part of the step 61 downward. This makes it possible to ensure a long length of the fitting hole 62 in the axial direction.

Providing the visor 63, the rib 64 and the walls 66 brings about enhancement of strength and stiffness of the vicinity of the fitting hole 62.

An outward recessed dent 67 is formed in an upper portion of the upper bulgy portion 60 of the inner face 58b. The dent 67 is placed directly above the fitting hole 62.

As illustrated in FIG. 2, FIG. 4, and FIG. 6, the light cover 25 includes a rod joint 68 provided on a front portion of the cover front-wall 56 for connection of the front end of the adjustment rod 39 thereto. The connector 38 of the headlight unit 24 projects downward below the light cover 25 from a hole (not shown) bored in the cover front-wall 56, and the rear end of the adjustment rod 39 is connected to the lower end of the connector 38.

The light cover 25 is situated above the front wheel 2, and sand and mud thrown up by the front wheel 2 are caught by the cover rear-wall 55, the cover front-wall 56 and the cover side-wall 58. In other words, the light cover 25 constitutes a part of the front fender 22.

An example of a process for assembling the headlight unit 24 to the light cover 25 is here described.

Referring to FIG. 3 and FIG. 4, the support-shaft protective members 45, 45 are mounted to the support shafts 40, 40 of the headlight unit 24. In this process, because the shaft bodies 42 and the support-shaft fitting holes 48 are formed in an approximately D shape, the positioning of the support-shaft protective members 45, 45 in the peripheral direction is facilitated and the support-shaft protective members 45, 45 are non-rotatable relative to the support shafts 40.

After the support-shaft protective members 45, 45 have been mounted to the support shafts 40, the flanges 47 abut on the bases 41 of the support shafts 40, facilitating the positioning of the support-shaft protective members 45, 45 in the axial direction. Further, the upper portions of the outer peripheral portions of the bases 41 are covered with the outer visors 52 of the support-shaft protective members 45. Thus, the outer visors 52 reject the foreign substances such as sand and the like attempting to intrude into the support shafts 40 side, preventing the intrusion of foreign substances into the support-shaft fitting holes 48.

The headlight unit 24 is assembled to the light cover 25. In this process, in the light cover 25 the cover side-walls are pressed outward in the right and left directions to elastically open up, then the headlight unit 24 is inserted into the light cover 25 from above and the support-shaft protective members 45, 45 are fitted into the fitting holes 62, 62 of the light cover 25. The cover side-walls 58 are out of the way of the insertion because of the dents 67 provided on the cover side-walls 58, so that the support-shaft protective members 45 can be smoothly assembled in the fitting holes 62.

Because the flanges 47,47 abut on the inner faces 58b, 58b of the light cover 25 including the walls 66, 66, the headlight unit 24 is positioned in the axial direction of the support shafts 40, 40.

The headlight unit 24 is pivotally supported by the fitting holes 62, 62 through the support-shaft protective members 45, 45 which are non-rotatable relative to the shaft bodies 42. As a result, when the headlight unit 24 is rotated, the outer peripheral surfaces of the support-shaft protective members 45, 45 and the inner peripheral surfaces of the fitting holes 62, 62 slide each other, but the shaft bodies 42, 42 do not slide. This makes it possible to prevent the wear of the outer peripheral surfaces of the shaft bodies 42, 42. If the outer peripheral surface of the support-shaft protective member 45 wears, the support-shaft protective member 45 alone may be replaced.

The optical axis adjustment of the headlight unit 24 is made by rotating the screw portion 39a of the adjustment rod 39. Rotating the screw portion 39a causes extension/contraction of the adjustment rod 39, making the headlight unit 24 rotate around the shaft bodies 42, 42.

Referring to FIG. 2 and FIG. 6 to FIG. 8, once the headlight unit 24 has been assembled to the light cover 25, foreign substances attempting to intrude into the fitting hole 62 from above will be rejected by the visor 63. Accordingly, a simple structure including the visor 63 enables checking the intrusion of foreign substances into the fitting hole 62, leading to a reduction in wear of the fitting hole 62 and the support-shaft protective member 45.

Even if the foreign substances intrude into the fitting hole 62, the foreign substances can be discharged into the groove 65 underneath the fitting hole 62. The rotation of the support-shaft protective member 45 promotes the discharge of the foreign substances into the groove 65. The foreign substances discharged into the groove 65 move along the bottom 65a which is inclined inward to be discharged into the light cover 25. That is, the groove 65 constitutes a discharge passage for foreign substances.

In some embodiments, the groove 65 gradually decreases in size from the inner face 58b of the cover side-wall 58 toward the outer face 58a. Because of this, the foreign substances in the fitting hole 62 is able to be discharged from the groove 65 into the light cover 25, while the amount of foreign substances intruding into the groove 65 from the outside of the cover side-wall 58 is able to be reduced.

As described above, according to certain embodiments, the light-device mounting structure of the ATV 10 includes the headlight unit 24 including the lamp housing 30 accommodating the light source 29, and the light cover 25 placed outside of the lamp housing 30. The support shafts 40, 40 provided in the lamp housing 30 are supported by the light cover 25 to mount the headlight unit 24 in an optical-axis adjustable manner. The support shafts 40, 40 are covered with the support-shaft protective members 45, 45, and the support-shaft protective members 45, 45 are engaged non-rotatably relative with respect to the support shafts 40, 40. The light cover 25 has the fitting holes 62, 62. The support shafts 40, 40 are fitted into the fitting holes 62, 62 via the support-shaft protective members 45, 45. As a result, the support shafts 40, 40 do not slide on the support-shaft protective members 45, 45, but rotate relative to the fitting holes 62, 62 via the support-shaft protective members 45, 45. This enables prevention of the wear of the support shafts 40, 40 serving as rotating parts with a simple structure.

The support-shaft protective member 45 includes the support-shaft fitting hole 48 and the flange 47. The support shaft 40 is fitted into the support-shaft fitting hole 48. The support-shaft fitting hole 48 is smaller than the flange 47. Because of this, the support shaft 40 can be easily protected only by being fitted into the support-shaft fitting hole 48, and the flange 47 facilitates the positioning of the headlight unit 24.

The support-shaft protective member 45 includes an outer visor 52 projecting from the flange 47. The outer visor 52 covers the support shaft 40. Because of this, the intrusion of foreign substances into a gap between the support-shaft protective member 45 and the support shaft 40 can be prevented by the outer visor 52.

The support-shaft fitting hole 48 is formed in an approximate D shape as viewed in the axial direction. Because of this, the support-shaft protective member 45 can be mounted with a simple structure non-rotatably relative to the support shafts 40 and without mistaking an assembling direction, resulting in prevention of the wear of the support shaft 40.

The light-device mounting structure of the ATV 10 includes the headlight unit 24 including the lamp housing 30 accommodating the light source 29, and the light cover 25 placed outside of the lamp housing 30. The support shafts 40, 40 are supported by the light cover 25 to mount the headlight unit 24 in an optical-axis adjustable manner. The light cover 25 includes visors 63, 63 provided above the fitting holes 62, 62 to which the support shafts 40, 40 are fitted in such a manner as to cover the fitting holes 62, 62, and the grooves 65 provided underneath the fitting holes 62, 62 to penetrate through inside and outside of the light cover 25. Because of this, the intrusion of foreign substances into the support shafts 40, 40 can be prevented by the visors 63, 63. Also, even if foreign substances intrude into a gap between the fitting holes 62, 62 and the support-shaft protective members 45, the foreign substances can be discharged out of the groove 65 located below. This makes it possible to prevent wear of the support shafts 40 with a simple structure. In this connection, the support shafts 40, 40 are included in the lamp housing 30, but are not so limited. For example, a support shaft may be fitted into the fitting hole 62 from outside of the cover side-wall 58 to be connected to the lamp housing 30. In the embodiment, the case the support shafts 40, 40 are fitted through the support-shaft protective members 45 into the fitting holes 62 is described, but is not so limited. The support shafts 40, 40 may be formed in size enough to be fitted into the fitting holes 62, 62 so as to be directly fitted into the fitting holes 62, 62.

The groove 65 serving as a discharge passage descending from the outside to the inside of the light cover 25 enables a downward discharge of foreign substances.

Further, because the groove 65 is formed to have a smaller size on the outside than on the inside of the light cover 25, the groove 65 enables the discharge of the foreign substances on the support shaft 40 side, while enabling a reduction in the amount of foreign substances intruding into the groove 65 from the outside.

Because the walls 66, 66 are formed on lateral sides of the groove 65 serving as the discharge passage, the scattering of the foreign substances discharged from the groove 65 can be prevented by the walls 66, 66 and also the strength in the vicinity of the fitting hole 62 can be enhanced.

Because the light cover 25 constitutes a part of the front fender 22, there is no necessity to increase the strength and stiffness of the light cover 25 only for the purpose of supporting the headlight unit 24. This enables a reduction in weight.

It is understood that the invention is not limited to the above-mentioned embodiments. Various design changes can be made without departing from the spirit and scope of the invention, which is defined by the appended claims.

REFERENCE SIGNS LIST

10 . . . All Terrain Vehicle (vehicle)
22 . . . Front fender (vehicle fender)
24 . . . Headlight unit (light device)
25 . . . Light cover
29 . . . Light source
30 . . . Lamp housing
40 . . . Support shaft
45 . . . Support-shaft protective member
47 . . . Flange
48 . . . Support-shaft fitting hole
52 . . . Outer visor (cap visor)
62 . . . Fitting hole
63 . . . Visor
65 . . . Groove (discharge passage)
66 . . . Wall

The invention claimed is:

1. A light-device mounting structure of a vehicle, said structure comprising:
a light device including a lamp housing accommodating a light source; and
a light cover disposed outside of the lamp housing, the lamp housing being provided with a support shaft supported by the light cover, wherein the light device is mounted in an optical-axis adjustable manner,
wherein the support shaft is covered with a support-shaft protective member, the support-shaft protective member being engaged non-rotatably relative to the support shaft,
wherein the light cover has a fitting hole that extends completely through the light cover,
wherein the support shaft is fitted into the fitting hole through the support-shaft protective member,
wherein the support-shaft protective member includes a flange,
wherein the support-shaft protective member includes a cap visor projecting from the flange, and
wherein the cap visor covers the support shaft.

2. The light-device mounting structure of a vehicle according to claim 1, wherein the support-shaft protective member includes a support-shaft fitting hole wherein the support shaft is fitted into the support-shaft fitting hole, and wherein the support-shaft fitting hole is smaller than the flange.

3. The light-device mounting structure of a vehicle according to claim 2, wherein the support-shaft fitting hole is formed in an approximate D shape as viewed in an axial direction.

4. The light-device mounting structure of a vehicle according to claim 1, wherein the light cover constitutes a part of a vehicle fender.

5. A light-device mounting structure of a vehicle, said structure comprising:
a light device including a lamp housing accommodating a light source; and
a light cover disposed outside of the lamp housing, the light cover supporting a support shaft, the light device being mounted in an optical-axis adjustable manner,
wherein the light cover includes a visor provided above a fitting hole to which the support shaft is fitted, to project from the light cover,
wherein the fitting hole extends completely through the light cover, and
wherein a groove is provided underneath the fitting hole to penetrate through inside and outside of the light cover.

6. The light-device mounting structure of a vehicle according to claim 5, wherein the groove has a discharge passage for a discharge of foreign substances, and wherein the discharge passage descends from an outside to an inside of the light cover.

7. The light-device mounting structure of a vehicle according to claim 5, wherein the groove is formed to have a smaller size on the outside than on the inside of the light cover.

8. The light-device mounting structure of a vehicle according to claim 6, further comprising walls formed on lateral sides of the discharge passage.

9. The light-device mounting structure of a vehicle according to claim 5, wherein the support shaft is covered with a support-shaft protective member, the support-shaft protective member being engaged non-rotatably relative to the support shaft, and wherein the support shaft is fitted into the fitting hole through the support-shaft protective member.

10. The light-device mounting structure of a vehicle according to claim 9, wherein the support-shaft protective member includes a support-shaft fitting hole and a flange, wherein the support shaft is fitted into the support-shaft fitting hole, and wherein the support-shaft fitting hole is smaller than the flange.

11. The light-device mounting structure of a vehicle according to claim 10, wherein the support-shaft protective member includes a cap visor projecting from the flange, and wherein the cap visor covers the support shaft.

12. The light-device mounting structure of a vehicle according to claim 10, wherein the support-shaft fitting hole is formed in an approximate D shape as viewed in an axial direction.

13. The light-device mounting structure of a vehicle according to claim 5, wherein the light cover constitutes a part of a vehicle fender.

14. A light-device mounting structure of a vehicle, said structure comprising:
   lighting means for providing a light source; and
   cover means disposed outside of the lighting means, wherein the lighting means includes a housing with a support shaft means supported by the cover means, wherein the lighting means is mounted in an optical-axis adjustable manner,
   wherein the support shaft means includes protective means, the protective means for protecting the support shaft means and being non-rotatably engaged relative to the support shaft means,
   wherein the cover means includes a fitting hole that extends completely through the cover means,
   wherein the support shaft means is fitted into the fitting hole through the protective means,
   wherein the protective means includes a flange means,
   wherein the protective means includes visor means projecting from the flange means, and
   wherein the visor means covers the support shaft means.

15. The light-device mounting structure according to claim 14, wherein the protective means includes a support shaft means fitting hole, wherein the support shaft means is fitted into the support shaft means fitting hole, and wherein the support shaft means fitting hole is smaller than the flange.

16. A light-device mounting structure of a vehicle, said structure comprising:
   lighting means for providing a light source; and
   cover means disposed outside of the lighting means, wherein the lighting means includes a housing with a support shaft means supported by the cover means, wherein the lighting means is mounted in an optical-axis adjustable manner,
   wherein the cover means includes a visor means provided above a fitting hole to which the support shaft means is fitted, to project from the cover means,
   wherein the fitting hole extends completely through the cover means, and
   wherein a groove is provided underneath the fitting hole to penetrate through inside and outside of the cover means.

17. The light-device mounting structure according to claim 16, wherein the groove includes discharge means for discharge of foreign substances, and wherein the discharge means descends from an outside to an inside of the cover means.

18. The light-device mounting structure according to claim 16, wherein the groove is formed to have a smaller size on the outside than on the inside of the cover means.

* * * * *